UNITED STATES PATENT OFFICE.

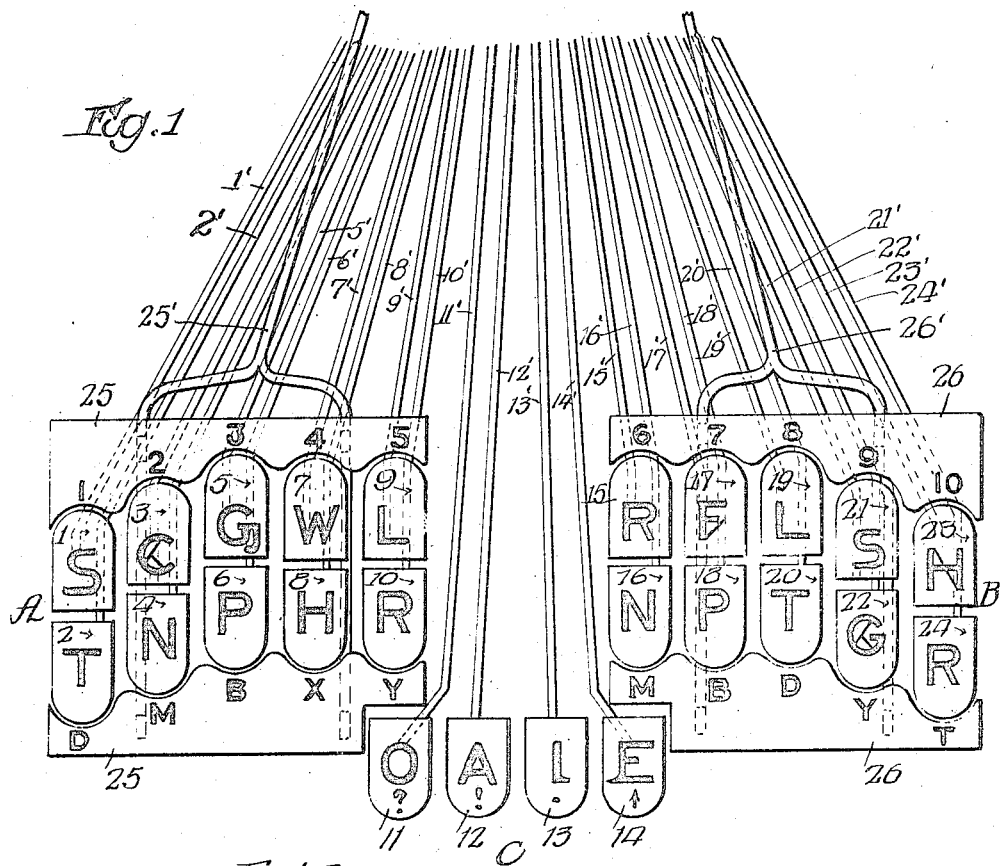

ALRAH B. EDWARDS, OF CHICAGO, ILLINOIS, ASSIGNOR TO SHORTWRITER COMPANY, OF WILMINGTON, DELAWARE, A CORPORATION OF DELAWARE.

KEYBOARD FOR WRITING-MACHINES.

1,214,023.                    Specification of Letters Patent.    Patented Jan. 30, 1917.

Application filed February 5, 1916.   Serial No. 76,362.

*To all whom it may concern:*

Be it known that I, ALRAH B. EDWARDS, a citizen of the United States, residing at Chicago, in the county of Cook and State of Illinois, have invented certain new and useful Improvements in Keyboards for Writing-Machines, of which the following is a specification.

This invention relates in general to keyboards for writing machines and more particularly to a keyboard adapted for use on machines in which a plurality of keys are struck to simultaneously print a plurality of characters indicating phonetically a word or syllable of a word.

It is the object of my invention to provide a keyboard for writing machines having shift keys disposed contiguously to the primary keys and adapted to be actuated by the same finger that actuates an individual primary key and in unison therewith.

A further object of my invention is the provision of a keyboard in which the primary keys bear monograms and alphabetic letters representing consonants and vowels to be printed when the primary keys are actuated singly and in which the shift keys bear numerals and letters to be printed when the shift keys are actuated in unison with the primary keys.

Further objects and advantages of my invention will be apparent as it is better understood by reference to the following specification when read in connection with the accompanying drawing, illustrating the preferred embodiment thereof, in which—

Figure 1 is a plan view of the keyboard according to my invention together with the connected key bars; Fig. 2 illustrates the printing position sequence of the characters delineated on the primary keys, and Fig. 3 indicates the printing position sequence of the characters delineated on the shift keys.

Referring to Fig. 1 of the drawing, a plurality of primary keys, numbered 1 to 24 inclusive, are illustrated as divided into three groups A, B and C: group A including keys numbered 1 to 10, inclusive, group B including keys numbered 15 to 24, inclusive, and group C including keys numbered 11 to 14, inclusive. The primary keys are mounted on key bars numbered 1' to 24', inclusive, extending rearwardly from the keyboard to the printing mechanism (not shown.)

The primary keys of each of groups A and B are arranged in two rows and a pair of elongated shift keys 25 and 26 are disposed at either side of the primary keys in groups A and B, respectively, and so arranged with respect to the primary keys that one of the shift keys 25 or 26 may be actuated by the same finger that actuates any individual primary key and in unison therewith. The pairs of keys 25 and 26 are rigidly connected to key bars 25' and 26' extending rearwardly from the keyboard to the printing mechanism.

Delineated on each of the primary keys of group A is a monogram or alphabetic letter representing the consonants S, T, C—K, N, G—J, P, W, H, L and R. Delineated on the primary keys of group B are monograms and alphabetic letters representing the consonants R, N, F—V, P, L, T, S, G—K, H—N and R. Delineated on the keys of group C are letters representing the vowels O, A, I and E. By reason of the arrangement of the keybars 1' to 24', inclusive, monograms and letters are printed when the primary keys are depressed in the sequence indicated in Fig. 2.

Delineated on the shift key 25, contiguous to the primary keys 1, 3, 5, 7 and 9, are the numerals 1, 2, 3, 4 and 5 and similarly delineated on the shift key 25, contiguous to the primary keys 2, 4, 6, 8 and 10 are the letters D, M, B, X and Y. Delineated on the shift key 26, contiguous to the primary keys 15, 17, 19, 21 and 23, are the numerals 6, 7, 8, 9 and 10 and similarly delineated on the shift key 26, contiguous to the primary keys 16, 18, 20, 22 and 24 are the letters M, B, D, Y and T.

When one of the primary keys, for example the key 1 bearing the letter S, and the contiguous shift key 25 are simultaneously depressed, the numeral 1 delineated on the shift key 25 will be printed in the position which would normally be occupied by the letter S if the key 1 was actuated singly.

Similarly if the primary key 2 bearing the letter T is depressed simultaneously with the contiguous shift key 25, the letter D will be printed in the position normally occupied by the letter T if the primary key 2 was actuated singly. The relation between the monograms and letters on the primary keys and the numerals and letters on the shift keys is the same throughout the keyboard so that the printing position sequence of the numerals and letters printed on the shift keys 25 and 26 is that indicated in Fig. 3.

The mode of using my invention will be apparent from the following brief description. The operator selects the monograms and letters indicating phonetically the word or syllable to be printed so far as is possible from the primary keys of groups A, B and C. The sequence of the monograms and letters on the primary keys may not, however, in all instances be such that they may be combined to properly indicate the word or syllable. The operator then selects the letters from the shift keys 25 and 26 and places his finger on a primary key contiguous to the desired letter on the shift key in such a manner as to overlap the shift key. All of the selected keys are then simultaneously depressed to print the desired word or syllable.

It will be readily understood from the foregoing that I have perfected a keyboard for writing machines affording a wide range of combinations of monograms and letters without unduly expanding the keyboard, thus providing a compact and easily operable machine for accomplishing the desired result.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. A keyboard for writing machines comprising two rows of primary keys and a pair of elongated rigidly connected shift keys, one of said shift keys being disposed on each side of said rows of primary keys and so arranged with respect to said primary keys that a contiguous shift key may be actuated by the same finger that actuates any individual primary key.

2. A keyboard for writing machines comprising two groups of keys, each consisting of two rows of primary keys and a pair of elongated shift keys, one of said shift keys being disposed on each side of said rows of primary keys and so arranged with respect to said primary keys that a contiguous shift key may be actuated by the same finger that actuates any individual primary key.

3. A keyboard for writing machines comprising two groups of keys, each consisting of two rows of primary keys and a pair of elongated rigidly connected shift keys, one of said shift keys being disposed on each side of said rows of primary keys and so arranged with respect to said primary keys that a contiguous shift key may be actuated by the same finger that actuates any individual primary key.

4. A keyboard for writing machines comprising a plurality of keys divided into groups, the keys of one of said groups bearing monograms and alphabetic letters representing the consonants S, T, C—K, N, G—J, P, W, H, L and R.

5. A keyboard for writing machines comprising a plurality of keys divided into groups, the keys of one of said groups bearing monograms and alphabetic letters representing the consonants R, N, F—V, P, L, T, S, G—K, H—N and R.

6. A keyboard for writing machines comprising a plurality of keys divided into groups, the keys of one of said groups being monograms and alphabetic letters representing the consonants S, T, C—K, N, G—J, P, W, H, L and R, the keys of another of said groups bearing monograms and alphabetic letters representing the consonants R, N, F—V, P, L, T, S, G—K, H—N and R, and the keys of the third group bearing alphabetic letters representing the vowels O, A, I and E.

7. A keyboard for writing machines comprising a plurality of keys divided into groups, two of said groups each consisting of two rows of primary keys, and a pair of elongated shift keys, one disposed on each side of said rows of primary keys and so arranged with respect to said primary keys that a contiguous shift key may be actuated by the same finger that actuates any individual primary key, the primary keys of one of said groups bearing monograms and alphabetic letters representing the consonants S, T, C—K, N, G—J, P, W, H, L and R and the contiguous shift keys bearing the numerals and letters 1, D, 2, M, 3, B, 4, X, 5 and Y, the primary keys of another group bearing monograms and alphabetic letters representing the consonants R, N, F—V, P, L, T, S, G—K, H—N and R, and the contiguous shift keys bearing the numerals and letters 6, M, 7, B, 8, D, 9, Y, 10 and T, and the keys of the third group bearing alphabetic letters representing the vowels O, A, I and E.

8. A keyboard for writing machines comprising two groups of keys, each consisting of two rows of primary keys and a pair of elongated shift keys, primary characters delineated on said primary keys indicating characters to be printed when said primary keys are individually actuated, one of said shift keys being disposed on each side of the rows of primary keys of each group and so arranged with respect to said primary keys that a contiguous shift key may be actuated by the same finger that actuates an individual primary key, and secondary characters delineated on said shift keys adjacent each primary key indicating characters to be printed when a shift key is actuated in unison with an individual primary key.

ALRAH B. EDWARDS.

Witnesses:
WM. F. BELT,
M. A. KIDDIE.

Copies of this patent may be obtained for five cents each, by addressing the "Commissioner of Patents, Washington, D. C."